May 1, 1956 K. M. BOWMAN 2,743,695
NON-TILTING ANCHOR
Filed Jan. 14, 1952 5 Sheets-Sheet 1
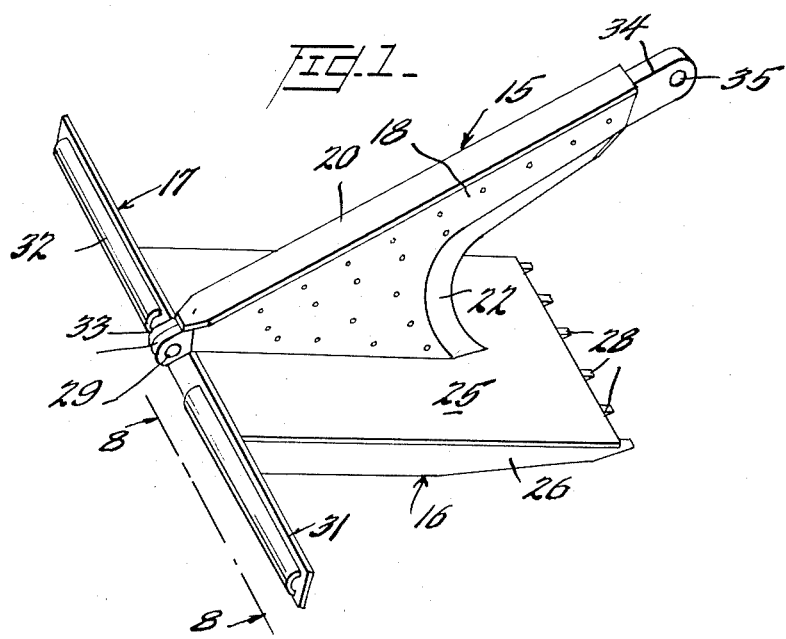
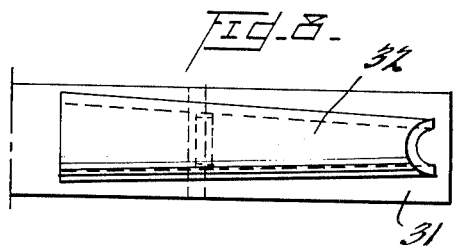
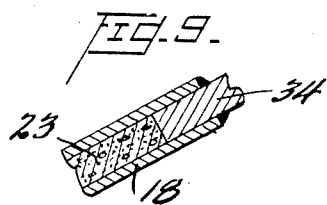
INVENTOR
Kingston M. Bowman,
BY George Sipkin
B. L. Zamjer
ATTORNEY

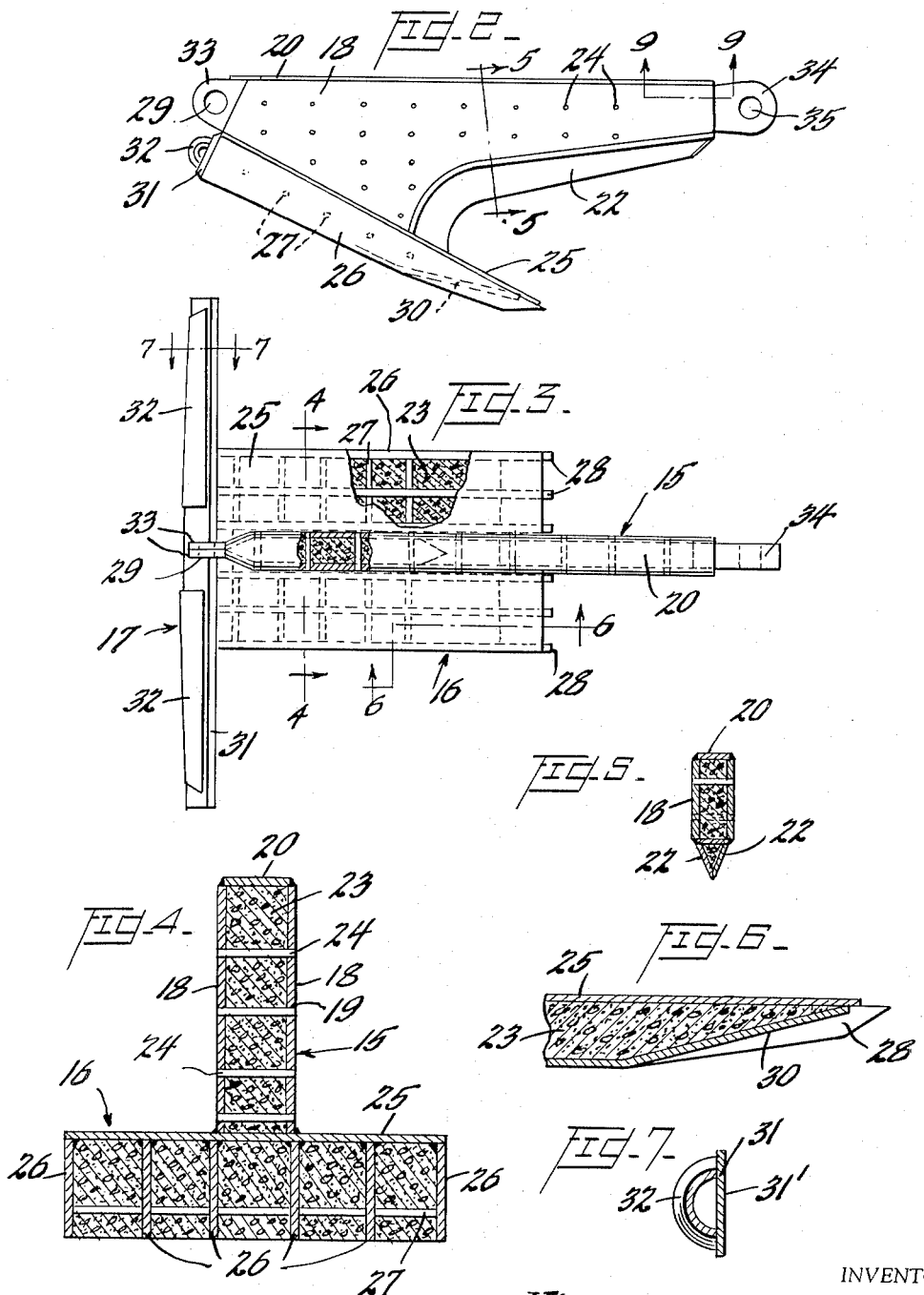

May 1, 1956     K. M. BOWMAN     2,743,695
NON-TILTING ANCHOR
Filed Jan. 14, 1952
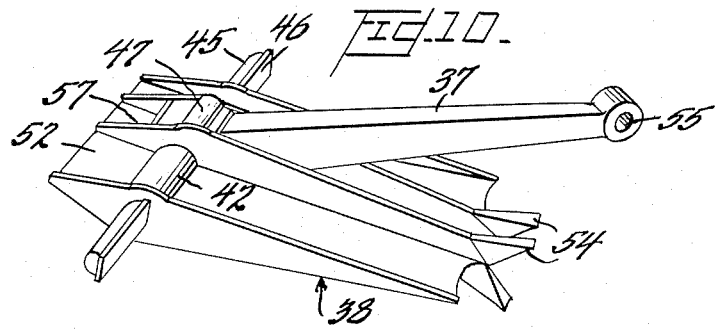
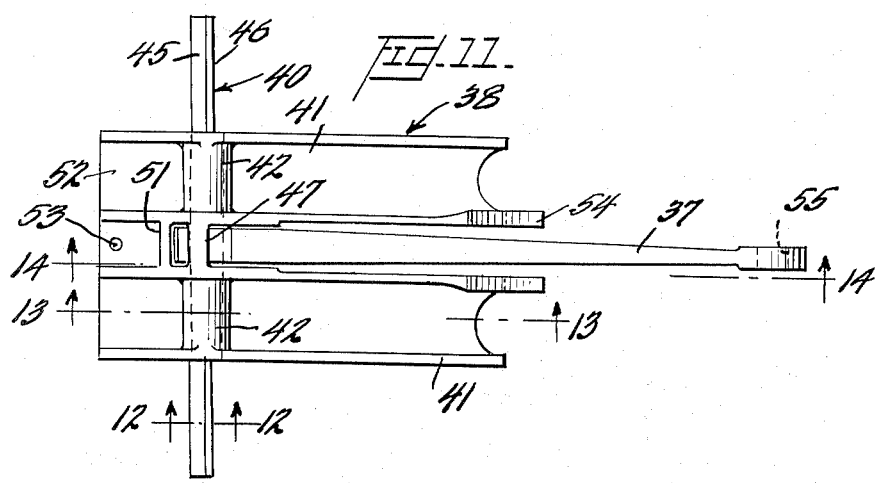
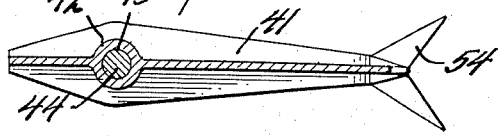
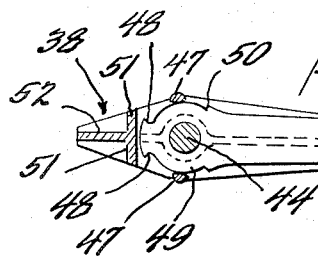
INVENTOR
Kingston M. Bowman,
BY George Sipkin
B. L. Tanguay
ATTORNEY

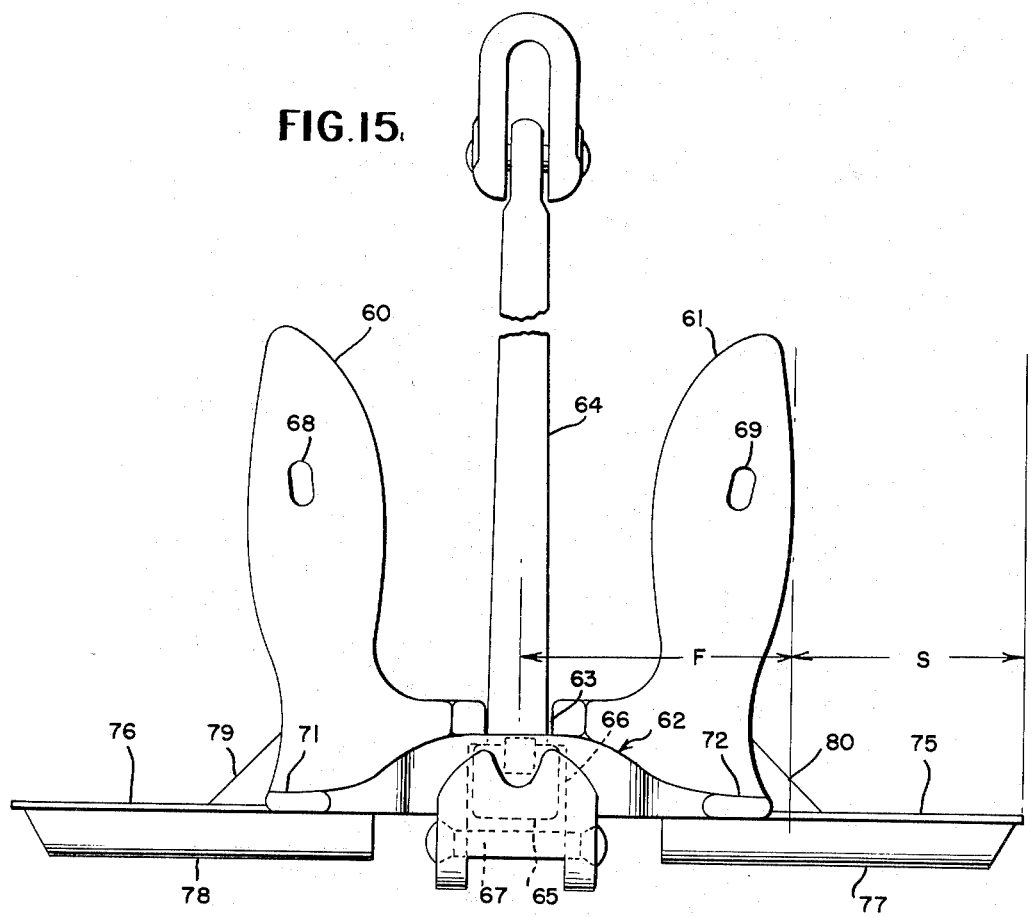

May 1, 1956  K. M. BOWMAN  2,743,695
NON-TILTING ANCHOR
Filed Jan. 14, 1952  5 Sheets-Sheet 5

DISTANCE IN FEET ANCHOR DRAGGED
10,000 LB NO. 2 NAVY STOCKLESS ANCHOR

INVENTOR
KINGSTON MILLER BOWMAN

BY George Sipkin
ATTORNEY

United States Patent Office 2,743,695
Patented May 1, 1956

2,743,695

NON-TILTING ANCHOR

Kingston Miller Bowman, Brookmont, Md.

Application January 14, 1952, Serial No. 266,433

17 Claims. (Cl. 114—207)

(Granted under Title 35, U. S. Code (1952), sec. 266)

The invention described herein may be manufactured and used by or for the Government of the United States of America for governmental purposes without the payment of any royalties thereon or therefor.

This application is a continuation in part of my co-pending application Serial No. 38,368, filed July 11, 1948, for Non-Tilting Anchors, now abandoned.

This invention relates to improvements in anchors, and especially to the provision of novel stabilizing stocks which prevent the anchors from tilting or rotating about the axis of the shank when being dragged through the soil forming the sea bottom.

Practically all known tumbling fluke type anchors, whether with or without stocks, have a serious fault in that they have a tendency to tilt and to corkscrew through the ground when dragged therethrough. They lose their holding power and even dig themselves out of the soil when so rotated. The rotation is about the axis of the line of pull applied to the anchor, and is thus normally coincident with the axis of the shank of the anchor. The rotation is apparently due to torque caused by a lack of symmetry of the two sides of the anchor on opposite sides of its center line, because similar anchors of the same weight will often rotate in opposite directions or at different rates. This has been found true even of anchors such as shown in Fig. 18, that have long round stocks protruding from the crown end of the anchor, and tests have proved that the elongating of such stocks will not prevent rotation of the anchors.

I have found that the addition of a flat stabilizing bar or stock on each side of the crown end of a stockless anchor, or the substitution of such bars for a conventional round stock of those anchors normally provided with stocks, will prevent the tilting and corkscrewing of the anchors when dragged through the soil. These flat stabilizing bars should be in the same plane as the fluke structure and have their flat faces perpendicular to the plane of the fluke structure and facing the working or forward end of the fluke structure, this being a highly important feature of the present invention. The necessary minimum length of the stabilizing bars may vary even for two similar anchors of the same weight, because as mentioned before, such similar anchors without the stabilizing bars may have varying degrees of stability and so require varying degrees of corrective action by the stabilizing bars.

Thus, in order to provide sufficient righting torque when canted, and thereby prevent corkscrewing of the anchor when being dragged, the stabilizing bars should be long enough so as to act upon undisturbed soil when the anchor is being dragged therethrough. If these stabilizing bars are short and protrude only a short distance beyond the sides of the fluke structure, then when the anchor is being dragged they will be operating only in soil that has been disturbed and loosened by the passage of the fluke structure. Another reason that the stabilizing bars must have a minimum length is that they exert a righting torque upon the anchor if it has begun to tilt. Thus, the farther from the axis of the shank that the righting force is applied the larger will be the righting torque. There should also be a sufficient area of the stabilizing bar at its outer ends to provide a resistance when being dragged through the soil, in order to develop the torque. The minimum lengths of the stabilizing bars are determined by the above requirements.

It is therefore a primary object of the present invention to provide an improved anchor having a stabilizing bar or stock adjacent the crown, with the stabilizing bar having a substantially flat surface that is always substantially perpendicular to the plane of the fluke structure or flukes.

Another major object resides in the provision of an anchor comprising metal plates welded together to form compartments filled with concrete or the like, whereby the anchor is cheap to manufacture and light in weight and yet has excellent holding power.

It is a further object to design an anchor having a single elongated fluke of substantially uniform width and a shank rigidly joined to the fluke. In this connection it is an object to so design and arrange the shank relative to the fluke structure as to make the anchor self-righting if it is dropped on its shank.

It is still another object of the present invention to provide an anchor with a fluke or flukes extending forwardly well beyond the crown to present considerable stabilizing and holding area to the earth.

Another object is to devise an anchor having a pivotal joint between fluke structure and crown that cannot be clogged with soil.

The foregoing and further objects of this invention should become clear upon a study of the following description when taken in conjunction with the accompanying drawings, wherein:

Fig. 1 is a top perspective view of one of the preferred forms of the invention;

Fig. 2 is a side elevational view of the same embodiment;

Fig. 3 is a top plan view thereof, in partial section;

Fig. 4 is an enlarged cross sectional view on the plane of line 4—4, Fig. 3;

Fig. 5, on reduced scale, represents a section taken along the plane of line 5—5, Fig. 2;

Fig. 6 is an enlarged fragmentary section taken on the irregular line 6—6, Fig. 3;

Fig. 7 is another sectional view, taken on line 7—7, Fig. 3;

Fig. 8 is a view looking forwardly into one half of the back or crown end of the stabilizer, as indicated by the arrows of line 8—8, Fig. 1;

Fig. 9 represents a fragmentary section taken on line 9—9, Fig. 2;

Fig. 10 is a perspective view of a modified form of the invention;

Fig. 11 is a plan view of the anchor of Fig. 10;

Fig. 12 is an enlarged fragmentary section taken along line 12—12, Fig. 11;

Fig. 13 is taken on the vertical plane of line 13—13, Fig. 11;

Fig. 14 is taken on the vertical plane of line 14—14, Fig. 11;

Fig. 15 is a top plan view of a U. S. Navy standard stockless anchor modified by the addition of stabilizing bars in accordance with my invention.

Fig. 16 is an end view of the modified anchor of Fig. 15, as viewed looking forwardly at the back or crown end of the anchor of Fig. 15.

Figure 17:
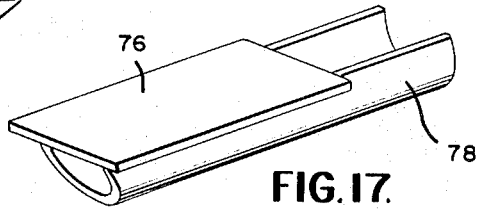

Fig. 17 is a perspective view of a reinforced stabilizer bar used in the anchor of Figs. 15 and 16.

Figure 18:
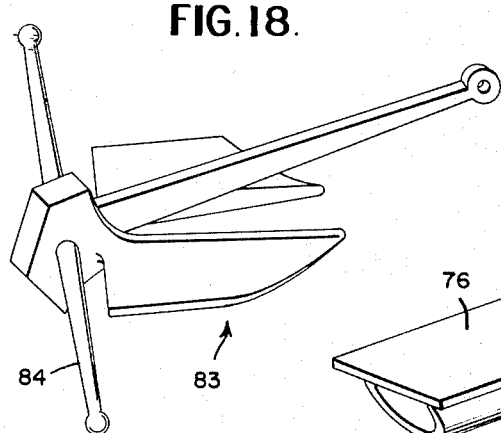

Fig. 18 is a perspective view of a modified "Danforth" type anchor, having a conventional stock.

Figure 19:
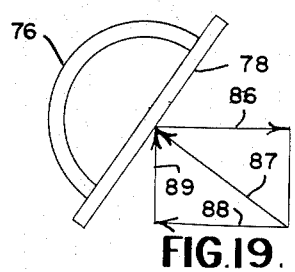

Fig. 19 shows a vector diagram of the forces acting upon the stabilizer bar to prevent the anchor from tilting.

Figure 20:
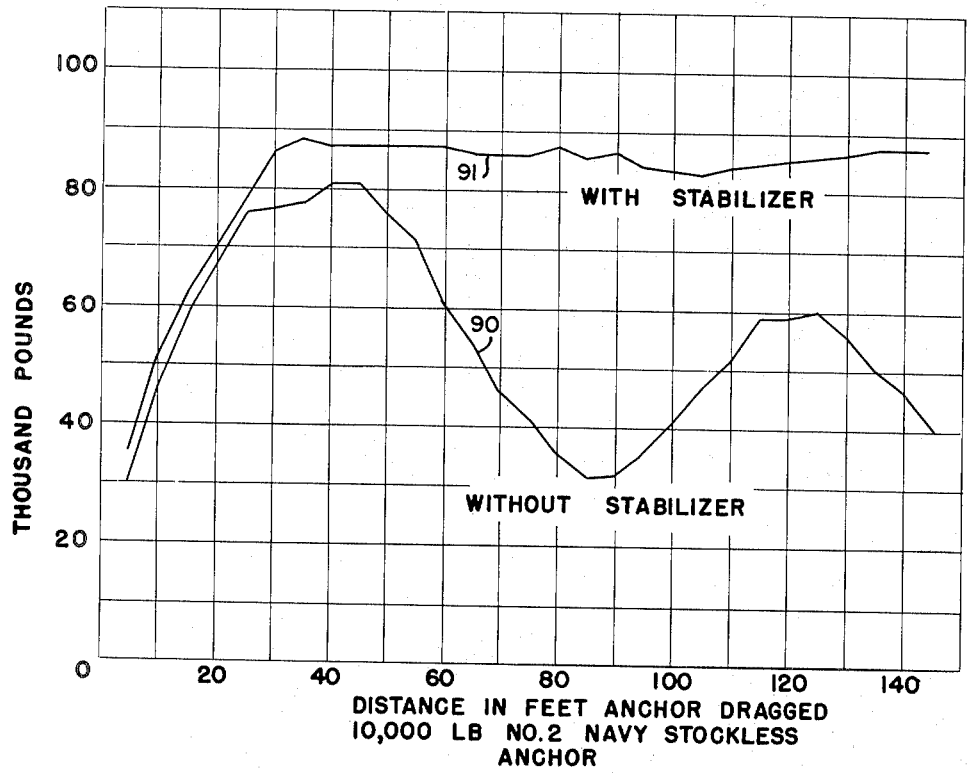

Fig. 20 is a chart showing the relative stability of an anchor of the type shown in Figs. 15 and 16, with and without stabilizers.

With continued reference to the drawings, and with reference first to Figs. 1-9, the complete anchor therein shown consists of three major portions, namely, a shank 15, a fluke structure 16 and a stabilizing stock 17, all reenforced and rigidly joined together.

The structure of the modification of Figs. 1-9 will be described observing the following conventions. The portion of the anchor structure at the juncture of the shank and fluke structure is called the back or crown part of the anchor. The portion of the anchor towards the digging end of the fluke structure and the cable attaching end of the shank is designated the forward or working end of the anchor. The portion of the fluke structure adjacent to and observable from the shank side is called the top while the portion of the fluke structure remote from the shank is called as the bottom of the fluke structure. The outer pair of plates 26 are at the extreme sides of the fluke structure. Other elements of the anchor are directionally located observing the same convention, i. e. as if the anchor were positioned with the bottom of the fluke structure, that is the part remote from the shank, resting upon a horizontal plane. The anchor is shown generally in this position in Fig. 1 of the drawings.

As better shown in Figs. 1, 2 and 4, the shank structure 15 comprises a pair of side plates 18, a top plate 20 and a V-shaped pair of forwardly bottom plates 22, welded together and to the fluke structure, as shown. The box-like structure thus formed is filled with concrete 23, and may be reenforced by a plurality of pins or rods 24 extending through countersunk holes in the plates 18 and welded thereto as at 19. The purpose of inclining the plates 22 is to form a soil penetrating edge that will assist the fluke structure in "digging in."

The lower or bottom edges of the side plates 18 slant and are welded to the top plate 25 of the fluke structure 16, as shown in Fig. 2, so that an angle of approximately 27 degrees is formed between the plate 25 of the fluke structure and the shank axis, which is defined by a line going through the centers of the eyes 29 and 35 (Fig. 2), this angle having been found most effective in experimental work. The general plane of the fluke structure may be defined as a plane substantially paralleling top plate 25 between the plate 25 and the bottoms of the longitudinal side plates 26 of the fluke structure.

The fluke structure 16 further comprises a plurality of substantially parallel longitudinally extending intermediate plates 26 welded to the plate 25 and traversed by a plurality of reenforcing and concrete-retaining rods 27. The forward or working ends of all of the plates 26 are inclined upwardly and cut sharply to form digging spurs 28 extending forwardly beyond the end of plate 25. As best seen in Fig. 6, inclined plates 30 are welded into position between the plates 26 and backwardly of the spurs 28 at the digging end to provide smooth wearing surfaces and to assist in holding the concrete.

The back or crown end of the fluke structure is closed by a sturdy bar 31 which is welded thereto with its ends projecting equal distances beyond the sides of the fluke structure, forming a stabilizing stock indicated generally at 17. The forward or working faces 31' of the projecting ends are flat and arranged at right angles to both the top plate 25 and the longitudinal plates 26 of the fluke structure so that the faces 31' are essentially perpendicular to the longitudinal axis of the fluke structure, this being a highly important feature of the present invention. The ends of the bar 31 are strengthened by a pair of hollow, roughly semi-cylindrical elements 32, welded thereto.

In order to provide sufficient righting torque when the anchor is canted, and thus prevent corkscrewing of the anchor when being dragged, the protruding ends of the stabilizing stocks 17 should be long enough so as to act upon undisturbed soil when the anchor is being dragged through the soil. If these stabilizing bars are short and protrude only a short distance beyond the sides of the fluke structure then, when the anchor's being dragged through the soil the stabilizing bars will be operating only in soil that has been disturbed and loosened by the passage of the fluke structure therethrough. Also, the righting action of the stabilizing bars should have a sufficiently long lever arm that the resultant torque will right the anchor if it becomes canted, and the flat surface of the stabilizing bar facing in the direction of the pointed or forward end of the fluke structure must have a sufficient area to provide a resistance when being dragged through the soil, in order to develop the torque.

In the case of the anchor shown in the embodiment of Figs. 1-9 the ends of the stabilizing bars protrude beyond the sides of the fluke by an amount that is about 160% of the distance from the centerline of the shank to the fluke structure's outer edge. The transverse width of the fluke structure is three feet eight inches. Each stabilizing bar on a stock protrudes two feet six inches perpendicularly from the sidewalls of the fluke structure and is one foot wide. However, this is for illustrative purposes only since tests on other types of anchors have shown, as will be described, that they need not protrude so far to be effective.

The crown or back end of the shank is closed by pressing the ends of its plates 18 together at 33. These ends have holes providing eye 29, as shown, for reception of a handling line or a float line. The forward end of the shank is closed by inserting a steel plug 34 and welding it in position, as best seen in Fig. 9. This plug has an eye 35 for reception of a special link (not shown) to which the anchor chain may be connected.

Making the anchor of steel plate and concrete has the advantages that it can be constructed at any point where such materials are available, that it is less costly than known anchors of equivalent holding power, and that it is light in weight as compared to its high holding power. Being a rigid structural assembly with no moving parts it cannot be fouled in the soil.

The novel stabilizing stocks or bars also cooperate to right the anchor if it should fall on its top when first dropped. It will be noted that if it falls flat on its top it will rest upon the relatively narrow top plate 20 of the shank, in which condition it is unstable and will topple over until it also rests upon either one or the other of the bars 31. Now this bar 31 will dig into the bottom as the anchor is dragged, and it will cause the anchor to corkscrew through 180 degrees whereupon the other bar 31 engages the bottom and the two bars cooperate to maintain the anchor at a near level position.

The stabilizer bars according to the invention may be applied, as by welding, to almost any type of anchor such, for example, as the Navy standard stockless anchor shown in Figs. 15 and 16. In Figs. 10-14, there is shown a special application of the bars to another novel anchor of the present invention, described below.

The modified form comprises an elongated steel shank 37, a fluke structure 38 pivotally connected thereto at the crown; and a pin and bar assembly 40. The fluke structure is cast in two longitudinally channeled sections 41 that are partially separated to permit them to swing past the shank on either side thereof. These sections are integral backwardly of the pivotal axis, and at said axis each has an integral sleeve 42 with internal cylindrical bore 43 for reception of a pivot pin 44.

Where the ends 45 of the pin 44 emerge from the sleeve they are cut away or halved into semicylindrical shape (see Fig. 12) and are welded to the outer sides of the fluke sections with their flat faces perpendicular to the general plane of the fluke structure. Flat bars 46 are welded to the forward faces of the protruding pin ends and to the fluke sections, and it necessarily follows that the flat bar surfaces oscillate with the fluke structure and are always perpendicular to the plane thereof.

At opposite sides of the pivot pin 44 the gap between the two fluke sections is bridged by oscillation limiting stops or bridges 47 that are integral with the sections. The hub 49 of the shank 37 has projections to provide two pairs of abutments 48 and 50 (Fig. 14) for engagement with the stops 47 to limit oscillation in either direction to about 35 degrees from a position of fluke structure and shank alignment, this angle having been found to produce maximum digging and holding power.

The fluke structure 38 has a vertical rib 51 or bridge, bridging the gap between the channeled sections 41 in close proximity to the shank hub 49, which is narrow and hence it will be noted that there are no soil catching pockets formed at or near the pivotal joint, and that there is little or no danger of the anchor becoming fouled. The fluke structure also has an integral platform 52 extending backwardly a substantial distance from the pivot. This platform greatly augments the holding power of the anchor and also assists the bars 46 in maintaining it in a balanced or substantially level digging and holding position. A central opening 53 in platform 52 may be used to attach a handling or float line, and the free end of the shank 37 has an eye 55 for an anchor chain.

The forward end of each fluke section has a "fishtail" spur 54, the divergent points of which cause the fluke structure to dig in regardless of which side of the anchor rests upon the bottom.

In Figs. 15 and 16 is shown a U. S. Navy Stockless anchor, modified by the addition of stabilizing bars or stocks in accordance with my invention. The anchor is of the tumbling fluke type, wherein the fluke structure is pivotally connected at its crown end to the shank. Stops limit the total angular movement to 70°, or 35° in either direction with respect to the shank axis.

The fluke structure has two prongs 60 and 61 which are usually integrally forged in one piece with the crown 62 which has a central opening 63 therethrough for the passage of the shank 64. A transverse cylindrical enlargement 65 on the end of the shank is received in an enlarged portion 66 of the opening 63, thus, preventing the shank from being pulled upward with respect to the crown as viewed in Fig. 15. A through pin 67 prevents withdrawal of the shank in the other direction. Openings 68 and 69 in the fluke structure prongs permit lashing of the fluke to the vessel to keep it from banging about when raised, with its shank in the vessel's hawse pipe. The crown of the anchor is provided with four feet 71, 72, 73 and 74 which protrude from the general plane of the fluke structure so that the crown end of the fluke structure will be raised from the bottom upon which the anchor is resting when first dropped. This raising of the crown end facilitates the entrance of the pointed end of the fluke prongs into the soil. The anchor as described is conventional in construction, and the application of my invention thereto will now be described.

A pair of stiff rectangular plates 75 and 76 are welded along one of their short edges to the outer ends of the crown, with their flat working faces perpendicular to the plane of the fluke structure and facing forwardly toward the pointed end of the fluke prongs. Reinforcing semi-tubular members 77 and 78 are welded along their edges to the back of the plates 75 and 76 and to the back of the crown, which they overlap to a considerable extent, as shown. Figure 17 shows the rectangular plate 76 and its reinforcing member 78 welded together before they are welded as a unit to one side of the crown. In order to further strengthen the stabilizer bars, small triangular reinforcing gusset elements 79 and 80 (Fig. 15) are welded to the working faces of the stabilizer bars or plates 75 and 76 and to the side edges of the fluke structure.

In Fig. 15, the distance from the centerline of the shank to the outer edge of the fluke structure at its widest point is indicated by the dimension F. The distance that the stabilizer bar 75 protrudes beyond the fluke structure at the widest point of the fluke structure is indicated by the dimension S. As has been previously mentioned, and as will now be described, the ratio of the dimension S to the dimension F has been found by experiment to have a critical minimum of from .50 to 1.03 depending upon variable factors such as the inherent stability of and weight of the particular anchor. In the case of the anchor shown in Figs. 15 and 16, the ratio of S to F is .85 but it is to be understood that the drawings are for illustrative purposes only. The essential requirement is that the length of the planar faces be such that they protrude outwardly substantially beyond the side edges of the fluke structure at its widest point to such a distance that they will operate in soil that is undisturbed by the passage of the fluke structuer therethrough and will provide adequate righting torque if the anchor is canted away from a level position. The thickness of the plates should be such that they will be rigid and non-deformable. For example, in the case of anchors of the type shown in Figs. 15 and 16 that have been modified by the addition of the stabilizer bars, these bars range in thickness from one-half inch for a 3,000 pound anchor to one inch for a 30,000 pound anchor. The widths of the plates range from 13 inches for a 3,000 pound anchor to 23 inches for the 30,000 pound anchor.

Although in all of the illustrated embodiments the stabilizing bars are shown to be rectangular it is to be understood that they may be of other outlines as long as they protrude outwardly beyond the sides of the anchor to sufficient distances and have sufficient working area adjacent their outer ends to provide adequate righting torque if the anchor is canted away from a level position.

Tests made with anchors of the type shown in Figure 18, having a tumbling fluke structure 83 and a long round stock 84 at the crown end of the fluke have shown conclusively that the round stock is ineffective to prevent corkscrewing of the anchor. It was found to be impossible to prevent this cork-screwing by lengthening the round stock, no matter how long it was made within practical limits. The anchor shown in Fig. 18 is a modified "Danforth" anchor.

Fig. 19 shows the righting effect obtained when using the flat stabilizing bars in accordance with my invention. With the flukes buried to the extent that the stabilizing bar 78 is within the soil, when dragged horizontally to the right the pulling force acting on the stabilizer is represented by the vector 86. The stabilizer bar resists this pulling force because of the earth pressure developed on the flat sloping face of the plate 78. This earth pressure acts normal to the plate 78 and at its center of pressure, and its force is represented by the vector 87. This vector 87 is the sum of vector 88 and the vertical vector 89. If now while the anchor is being dragged one side of the anchor starts to become lower than the other side it will operate in a denser material and continued movement will increase the value of vector 87 and hence the vertical restoring vector 89. Thus, the action is such as to immediately start a restoring action as soon as one side of the anchor becomes lower than the other side.

The effect of the addition of stabilizers in accordance with my invention is illustrated in Figure 20. Curve 90 shows the average results of six tests made by dragging a 10,000 pound Navy Stockless anchor of the type shown in Figs. 15 and 16, but without the added stabilizers. The curve shows that the anchor became buried and developed its maximum holding power of about 80,000 pounds after being dragged about 35 feet. With continued dragging the anchor began to cork-screw, losing its holding power as it twisted through 180 degrees and emerged from the bottom after being dragged about 85 feet. The second time the anchor dug in it did not reach the previous maximum holding power before it twisted again after 120 feet.

Curve 91 shows the average results of six tests made with the same anchor but with stabilizers added in accordance with my invention. The curve shows that the anchor reached its maximum holding power after being dragged the same distance as in curve 90, but the maximum holding power was slightly higher, and this maximum holding power was maintained throughout the length of each of the tests. As mentioned above, a tumbling fluke anchor (Fig. 18) with a round stock could not be kept from corkscrewing no matter how long the round stock was made, within practical limits.

Obviously, many modifications and variations of the present invention are possible in the light of the above teachings. It is therefore to be understood that within the scope of the appended claims the invention may be practiced otherwise than as specifically described.

What is claimed and desired to be secured by U. S. Letters Patent is:

1. In an anchor, a fluke structure having a digging end and a crown end; a shank joined to said fluke structure adjacent the crown end thereof; and a pair of elongated rigid members fixedly connected at their end portions to said fluke structure at the crown end thereof and extending outwardly and transversely therefrom on opposite sides thereof in the same general plane of the fluke structure, said rigid members having primary forwardly facing working faces lying only in a common plane which is normal to the general plane of the fluke structure, said planar working faces forming the only portion of said members having any substantial area facing the digging end of said fluke structure, said planar faces having a width which is substantially less than the length of said faces, the length of said planar faces being such that they protrude outwardly beyond the side edges of the fluke structures at the widest point thereof, the extensions beyond said side edges each being a minimum length which is substantially equivalent to at least from 0.5 to 1.03 times the distance from the center line of the shank to one of said side edges of the fluke structure at its widest point so that said planar faces will provide righting torque if the anchor is canted away from a level position while being dragged.

2. An invention as defined in claim 1 but further characterized by said planar working facing having the same contour in their parts extending beyond said side edges of said fluke structure, said contours being rectangular.

3. An invention as defined in claim 1 but further characterized by said rigid members comprising an individual plate providing at least one of said planar faces.

4. In an anchor having a crown end, an elongated rigid metal member at the crown end forming a stock having a substantially flat forward face; a pair of substantially parallel side plate members each affixed at its crown end to the flat face of said stock at points spaced from the ends thereof, the forward ends of said plate members being pointed to form digging ends; a top plate member joining the top edges of said side plate members and forming with said side plate members and the central part of said stock a fluke structure, said fluke structure having a pointed digging end, said stock protruding from the sides of said fluke structure with the protruding portion having forwardly facing planar working faces; a a shank secured to said fluke structure; and means in said fluke structure providing a bottom surface substantially paralleling a planar surface including the bottom edges of said side plate members rearward of said pointed ends.

5. An invention as defined in claim 4 but further characterized by said shank being rigidly secured to said fluke structure, with the center line of the shank at an angle of about 27 degrees with respect to said top plate member, with the apex of the angle adjacent the crown end of said fluke structure.

6. An invention as defined in claim 4 but further characterized by said shank comprising a pair of spaced plates forming the sides thereof, each of said plates being rigidly secured to said top plate member of said fluke structure.

7. An invention as defined in claim 6 but further characterized by a filler of concrete in said shank between said shank side members and said fluke structure top plate member.

8. An invention as defined in claim 7 but further characterized by said fluke structure comprising a filler of concrete between its said side plate members and top plate member.

9. An invention as defined in claim 8 but further characterized by said fluke structure comprising wear plate members in the gap between said fluke structure side plate members and slightly spaced from the pointed digging ends of said fluke structure to form wearing means for said concrete filler of said fluke structure.

10. An anchor having a crown end, said anchor comprising a fluke structure; a shank; and a stock; said fluke structure comprising a top plate member, side plate members having forward pointed digging ends, a filler body of concrete, and wear plate means extending substantially to the bottom of said side plate members between said side plates at the forward end of said fluke structure; said shank comprising a top member at an angle of about 27° to said fluke structure top plate member, substantially parallel side plates having bottom edges secured to said top plate member, plate members extending from forward edges to said side plates and slanting towards each other to form a digging edge, and a filler body of concrete extending substantially to said top member.

11. An anchor as defined in claim 10 but further characterized by said stock comprising portions extending sideways from each side of said fluke structure, each extension being a minimum length which is substantially equivalent to at least 0.5 to 1.03 times the distance from the center line of the shank to one of the side edges of the fluke structure at its widest point, said extensions having planar working faces facing forwardly, said planar working faces lying substantially in a plane normal to the general plane of said fluke structure.

12. In an anchor, a fluke structure having a digging end and a crown end; a shank pivotally jointed to the fluke structure adjacent the crown end thereof for rotation about an axis transverse to the fluke structure; means limiting the rotation of the shank with respect to the fluke structure; and a pair of elongated members comprising plates forming a stabilizing stock fixedly secured to the fluke structure adjacent the crown end thereof, said plates having substantially planar working faces facing the digging end of the fluke structure, and extending transversely outwardly on opposite sides of the fluke structure in the same plane as the general plane of the fluke structure and substantially beyond the side edges of the fluke structure at its widest point to distances equal to 0.5 to 1.03 times the distance from the center line of fluke structure to the widest point of the fluke structure so that said plates will provide adequate righting torque when the anchor is canted away from a level position.

13. In an anchor, a fluke structure having a digging end and a crown end; a pivot pin extending transversely through said fluke structure adjacent its crown end, secured to said fluke structure against rotation with respect thereto, and protruding beyond the longitudinal sides of the fluke structure distances equal to 0.5 to 1.03 times the distance from the centerline of the fluke structure to the widest point of the fluke structure; a shank pivotally mounted upon said pivot pin centrally of the width of said fluke structure; means limiting the rotation of said shank with respect to said fluke structure; those portions of said pivot pin protruding beyond the sides of said fluke structure having surfaces facing the digging end of said fluke structure and normal to the general plane of the fluke structure; and elongated planar members, substantially as long as said surfaces, secured to said surfaces and having planar faces with areas greater than said surfaces so that the width of said planar members is greater than the diameter of said pivot pin whereby at least portions of said elongated planar members will operate in soil that is undisturbed by the passage of the fluke structure therethrough and will provide adequate righting torque when the anchor is canted away from a level position.

14. In an anchor, an elongated rigid stock member located at the crown end of said anchor, said stock member having at least one substantially flat rectangular surface with a long axis and a short axis, a generally flat fluke structure rigidly attached to said stock and having a central plane parallel to its largest surfaces, said central plane extending from the long axis of said flat surface in a direction perpendicular to said short axis, said fluke structure terminating in a digging end, and a shank attached at said crown end of said anchor and extending along an operating axis centrally located and at right angles with respect to said long axis of the flat surface of the stock and at an acute angle to the central plane of said fluke structure, said stock member extending beyond the fluke structure in the direction of said long axis a distance at least equal to .5 to 1.03 times the distance from a projection of the axis of said shank perpendicularly on to the central plane of the fluke structure to the edge of said fluke structure at its widest portion.

15. An anchor according to claim 14 wherein said generally flat fluke structure is made up of a flat top plate forming one surface of the fluke structure and attached to the said flat surface of said stock and a pair of side plates mounted at right angles to said top plate and attached to said flat surface and to said top plate.

16. An anchor according to claim 15 wherein said side plates are pointed at the ends thereof remote from the point of attachment to said stock to form the digging end of said fluke structure.

17. An anchor according to claim 14 wherein said shank is pivotally attached to said stock structure at the crown end of said anchor, and stops are provided on said fluke structure to limit the pivotal movement of said shank with respect to the central plane of said fluke structure.

References Cited in the file of this patent

UNITED STATES PATENTS

| | | |
|---|---|---|
| Re. 21,841 | Northrop et al. | June 24, 1941 |
| 709,914 | Lenox | Sept. 30, 1902 |
| 822,097 | Bowen | May 29, 1906 |
| 1,550,451 | Pardey | Aug. 18, 1925 |
| 2,282,566 | Danforth | May 12, 1942 |
| 2,464,661 | Woodland | Mar. 15, 1949 |

FOREIGN PATENTS

| | | |
|---|---|---|
| 8,184 | Great Britain | Apr. 17, 1905 |
| 132,808 | Great Britain | Mar. 31, 1921 |
| 574,326 | Great Britain | Jan. 1, 1946 |